(12) United States Patent
McManus

(10) Patent No.: US 6,705,226 B1
(45) Date of Patent: Mar. 16, 2004

(54) MEDIA CLAMPING APPARATUS AND METHOD FOR AN EXTERNAL DRUM IMAGING SYSTEM

(75) Inventor: Kevin T. McManus, Rowley, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 10/230,584

(22) Filed: Aug. 29, 2002

(51) Int. Cl.⁷ ................................................. B41F 27/12
(52) U.S. Cl. ..................... 101/409; 101/415.1; 271/277
(58) Field of Search .............................. 101/409, 415.1, 101/378, 401.1, 483; 347/262; 399/304; 271/277, 276, 204, 206, 82, 85; 294/119.3; 198/835

(56) References Cited

U.S. PATENT DOCUMENTS

| | | | |
|---|---|---|---|
| 3,058,417 A | 10/1962 | Norlin | 101/415.1 |
| 3,715,981 A | 2/1973 | Huffman | 101/415.1 |
| 3,769,868 A | 11/1973 | Hornung | 83/348 |
| 4,660,825 A | 4/1987 | Umezawa | 271/276 |
| 4,938,134 A | 7/1990 | Dorsam et al. | 101/415.1 |
| 5,184,554 A | 2/1993 | Merkel et al. | 101/415.1 |
| 5,333,547 A * | 8/1994 | Pfisterer et al. | 101/409 |
| 5,335,046 A | 8/1994 | Bosy | 101/415.1 |
| 5,402,722 A | 4/1995 | Schneider et al. | 101/415.1 |
| 5,518,231 A | 5/1996 | Reddy | 271/277 |
| 5,732,629 A | 3/1998 | Puschnerat et al. | 101/415.1 |
| 5,738,012 A | 4/1998 | Metrope | 101/415.1 |
| 6,412,413 B1 | 7/2002 | Tice et al. | 101/409 |

OTHER PUBLICATIONS

Gilpin, S.R., "Film Clamp," IBM Technical Disclosure Bulletin, vol. 16, No. 11, Apr. 1974.

* cited by examiner

Primary Examiner—Leslie J. Evanisko
(74) Attorney, Agent, or Firm—John A. Merecki; Robert A. Sabourin

(57) ABSTRACT

An apparatus and method for clamping the leading edge of a supply of recording media, such as a printing plate, on the external drum of an imaging system. The leading edge clamping apparatus includes a spring segment disposed on the external drum, wherein the spring segment may be selectively displaced between a clamping position for clamping the leading edge of the printing plate against the external drum and a release position, and an inflatable member positioned between the spring segment and the external drum for displacing the spring segment between the clamping position and the release position.

25 Claims, 9 Drawing Sheets

MEDIA CLAMPING APPARATUS AND METHOD FOR AN EXTERNAL DRUM IMAGING SYSTEM

FIELD OF THE INVENTION

The present invention is in the field of imaging systems. More particularly, the present invention provides an apparatus and method for clamping the leading edge of a supply of recording media, such as a printing plate, on the external drum of an imaging system.

BACKGROUND OF THE INVENTION

In external drum imaging systems, a movable optical carriage is commonly used to displace an image recording source in a slow scan direction while a cylindrical drum, having recording media mounted on an external surface thereof, is rotated with respect to the image recording source. The drum rotation causes the recording media to advance past the image recording source along a fast scan direction that is substantially perpendicular to the slow scan direction.

The image recording source may include an optical system for generating one or more imaging beams that are scanned across the surface of the recording media. Each imaging beam may be separately modulated according to a digital information signal representing data corresponding to the image to be recorded.

The recording media to be imaged by an external drum imaging system is commonly supplied in discrete, flexible sheets, hereinafter collectively referred to as "printing plates." Each printing plate may comprise one or more layers supported by a support substrate, which for many printing plates is a plano-graphic aluminum sheet. Other layers may include one or more image recording (i.e., "imageable") layers such as a photosensitive, radiation sensitive, or thermally sensitive layer, or other chemically or physically alterable layers. Printing plates that are supported by a polyester support substrate are also known and can be used in the present invention. Printing plates are available in a wide variety of sizes, typically ranging, e.g., from 9"×12", or smaller, to 58"×80", or larger.

Many clamping systems are available for holding the leading edge of a printing plate on the external drum of an imaging system. One example of a leading edge clamping mechanism is disclosed in U.S. Pat. No. 6,412,413, incorporated herein by reference. Although the leading edge clamping mechanism disclosed in this reference is highly effective, it has several drawbacks. For example, the leading edge clamping mechanism uses a fixed actuator to selectively open and close a clamping portion. As such, the clamping portion can only be opened and closed when it is positioned at a single circumferential position of the external drum (i.e., under the fixed actuator). Further, the leading edge clamping mechanism is a fairly complex mechanical assembly that has a high part count and is expensive to produce.

SUMMARY OF THE INVENTION

The present invention provides an apparatus and method for clamping the leading edge of a printing plate on the external drum of an imaging system.

Generally, the present invention provides an apparatus, comprising:

a spring segment disposed on the external drum, wherein the spring segment may be selectively displaced between a clamping position for clamping the leading edge of the printing plate against the external drum and a release position; and an inflatable member positioned between the spring segment and the external drum for displacing the spring segment between the clamping position and the release position.

The present invention further provides a method comprising:

selectively displacing a spring segment between a clamping position for clamping the leading edge of the printing plate against the external drum and a release position; and displacing the spring segment between the clamping position and the release position using an inflatable member positioned between the spring segment and the external drum.

The present invention additionally provides an imaging system comprising:

an external drum for supporting a printing plate;

a system for recording image data onto the printing plate; and a leading edge clamping apparatus for clamping a leading end of the printing plate on the external drum, the leading edge clamping apparatus including:

a spring segment disposed on the external drum, wherein the spring segment may be selectively displaced between a clamping position for clamping the leading edge of the printing plate against the external drum and a release position; and an inflatable member positioned between the spring segment and the external drum for displacing the spring segment between the clamping position and the release position.

The present invention further includes a leading edge clamping apparatus for clamping a leading end of a printing plate on an external drum of an imaging system, comprising:

an inflatable member; and a shield that may be selectively displaced by the inflatable member between a clamping position for clamping the leading edge of the printing plate against the external drum and a release position.

The present invention also provides a leading edge clamping apparatus for clamping a leading end of a printing plate on an external drum of an imaging system, comprising:

a groove formed in the external drum, wherein a wall of the groove serves to register the leading edge of the printing plate on the external drum; and an inflatable clamp positioned in the external drum adjacent a side of the groove, wherein the inflatable clamp may be selectively displaced between an inflated, clamping position for clamping the leading edge of the printing plate to the external drum and a deflated, release position.

The present invention further provides a leading edge clamping apparatus for clamping a leading end of a printing plate on an external drum of an imaging system, comprising:

an inflatable member positioned between a spring segment and the external drum for displacing the spring segment between a clamping position and a release position.

BRIEF DESCRIPTION OF THE DRAWINGS

The features of the present invention will best be understood from a detailed description of the invention and embodiments thereof selected for the purpose of illustration and shown in the accompanying drawings in which.

DETAILED DESCRIPTION OF THE INVENTION

Figure 1:
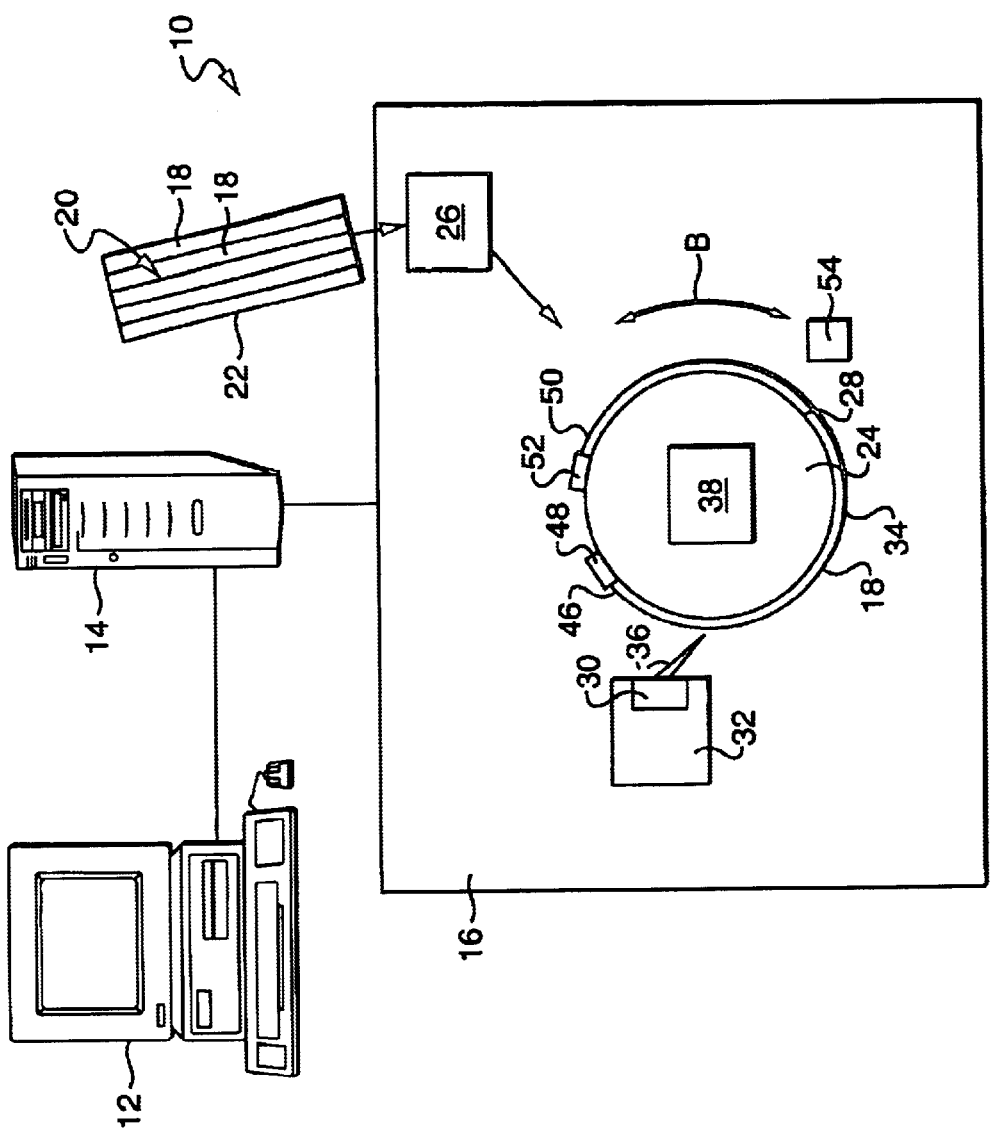
FIG. 1 illustrates an external drum imaging system for recording images onto a printing plate.

The features of the present invention are illustrated in detail in the accompanying drawings, wherein like reference numerals refer to like elements throughout the drawings. Although the drawings are intended to illustrate the present invention, the drawings are not necessarily drawn to scale.

An example of an external drum imaging system 10 is illustrated in FIG. 1. In this example, the imaging system 10 comprises an external drum platesetter configured to record digital data onto a printing plate 18. Although described below with regard to an external drum platesetter, the clamping apparatus and method of the present invention may be used in conjunction with a wide variety of other types of external drum, internal drum, or flatbed imaging systems, including imagesetters and the like, without departing from the intended scope of the present invention. Further, the clamping apparatus and method of the present invention may be used to clamp an unexposed printing plate on the plate cylinder of a printing press having an "on-press" imaging system. In its broadest sense, the clamping apparatus and method of the present invention may be used to clamp a sheet-like material to any type of cylindrical drum.

The imaging system 10 generally includes a front end computer or workstation 12 for the design, layout, editing, and/or processing of digital files representing pages to be printed, a raster image processor (RIP) 14 for processing the digital pages to provide rasterized page data (e.g., rasterized digital files) for driving an image recorder, and an image recorder or engine, such as an external drum platesetter 16, for recording the rasterized digital files onto a printing plate 18.

A stack 20 of printing plates 18 is commonly supplied in a cassette 22. A printing plate 18 is picked off of the stack 20 and subsequently mounted on an external drum 24 of the external drum platesetter 16 by an autoloading system 26.

Figure 2:
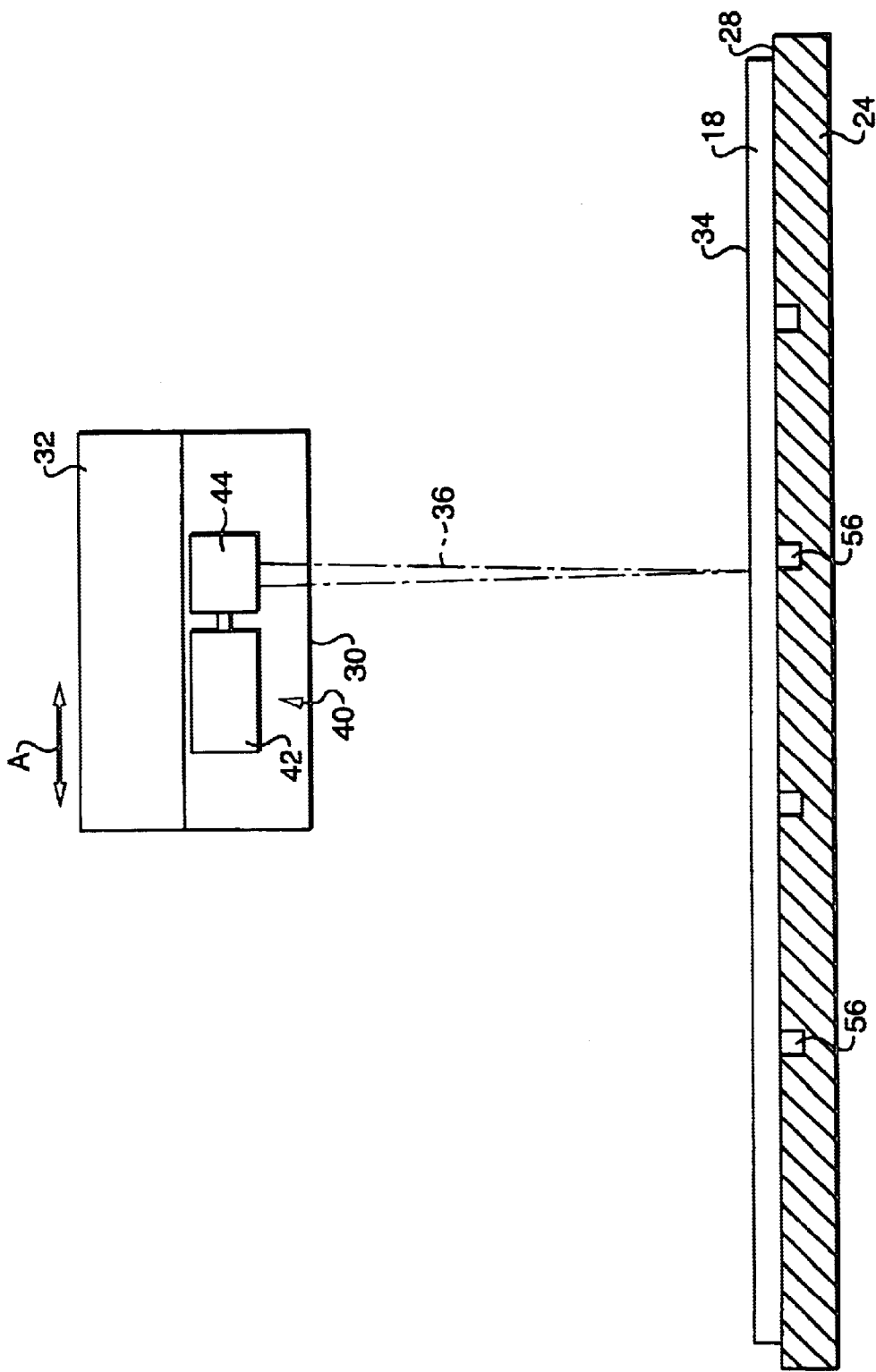
FIG. 2 illustrates an example of an imaging system including a movable optical carriage and scanning system, usable in the external drum imaging system of FIG. 1.

The external drum platesetter 16 includes an external drum 24 having a cylindrical media support surface 28 for supporting a printing plate 18 during imaging. The external drum platesetter 16 further includes a scanning system 30, coupled to a movable carriage 32, for recording digital data onto the imaging surface 34 of the printing plate 18 using a single or multiple imaging beams 36. An example of a scanning system 30 is illustrated in FIG. 2. In particular, the scanning system 30 is displaced by the movable carriage 32 in a slow scan axial direction (directional arrow A) along the length of the rotating external drum 24 to expose the printing plate 18 in a line-wise manner when a single beam is used or in a section-wise manner for multiple beams. Other types of imaging systems may also be used in the present invention.

The external drum 24 is rotated by a drive system 38 in a clockwise or counterclockwise direction as indicated by directional arrow B in FIG. 1. Typically, the drive system 38 rotates the external drum 24 at a rate of about 100–1000 rpm. As further illustrated in FIG. 2, the scanning system 30 includes a system 40 for generating the imaging beam or beams 36. The system 40 comprises a light or radiation source 42 for producing the imaging beam or beams 36 (illustrated for simplicity as a single beam), and an optical system 44 positioned between the radiation source 42 and the media support surface 28 for focusing the imaging beam or beams 36 onto the printing plate 18. It should be noted, however, that the system 40 described above is only one of many possible different types of scanning systems that may be used to record image data on the printing plate 18.

In the external drum imaging system 10 shown in FIG. 1, the leading edge 46 of the printing plate 18 is held in position against the media support surface 28 of the external drum 24 by a leading edge clamping mechanism 48. Similarly, the trailing edge 50 of the printing plate 18 is held in position against the media support surface 28 of the external drum 24 by a trailing edge clamping mechanism 52. As detailed in U.S. Pat. No. 6,412,413, a vacuum clamping bar or magnetic clamps may be used to implement the trailing edge clamping system 52. Many other known systems may also be used to clamp the trailing edge 50 of printing plate 18 against the media support surface 28 of the external drum 24. The leading edge clamping mechanism 48 and the trailing edge clamping mechanism 52 both provide a tangential friction force between the printing plate 18 and the media support surface 28 of the external drum 24 that is sufficient to resist the tendency of the edges of the printing plate 18 to pull out of the clamping mechanisms 48, 52, at a high drum rotational speed.

A vacuum source 54 may be used to draw a vacuum through an arrangement of ports and vacuum grooves 56 (FIG. 2) to hold the printing plate 18 against the media support surface 28 of the external drum 24. The vacuum source 54 may also supply a vacuum to the autoloading system 26 that is configured to remove or "pick" the top printing plate 18 from the stack 20 of printing plates. A registration system comprising, for example, a set of registration pins on the external drum 24, and a plate edge detection system (not shown), may be used to accurately and repeatably position and locate each printing plate 18 on the external drum 24.

A first embodiment of a leading edge clamping mechanism 100 in accordance with the present invention is illustrated in FIGS. 3–6.

Figure 3:
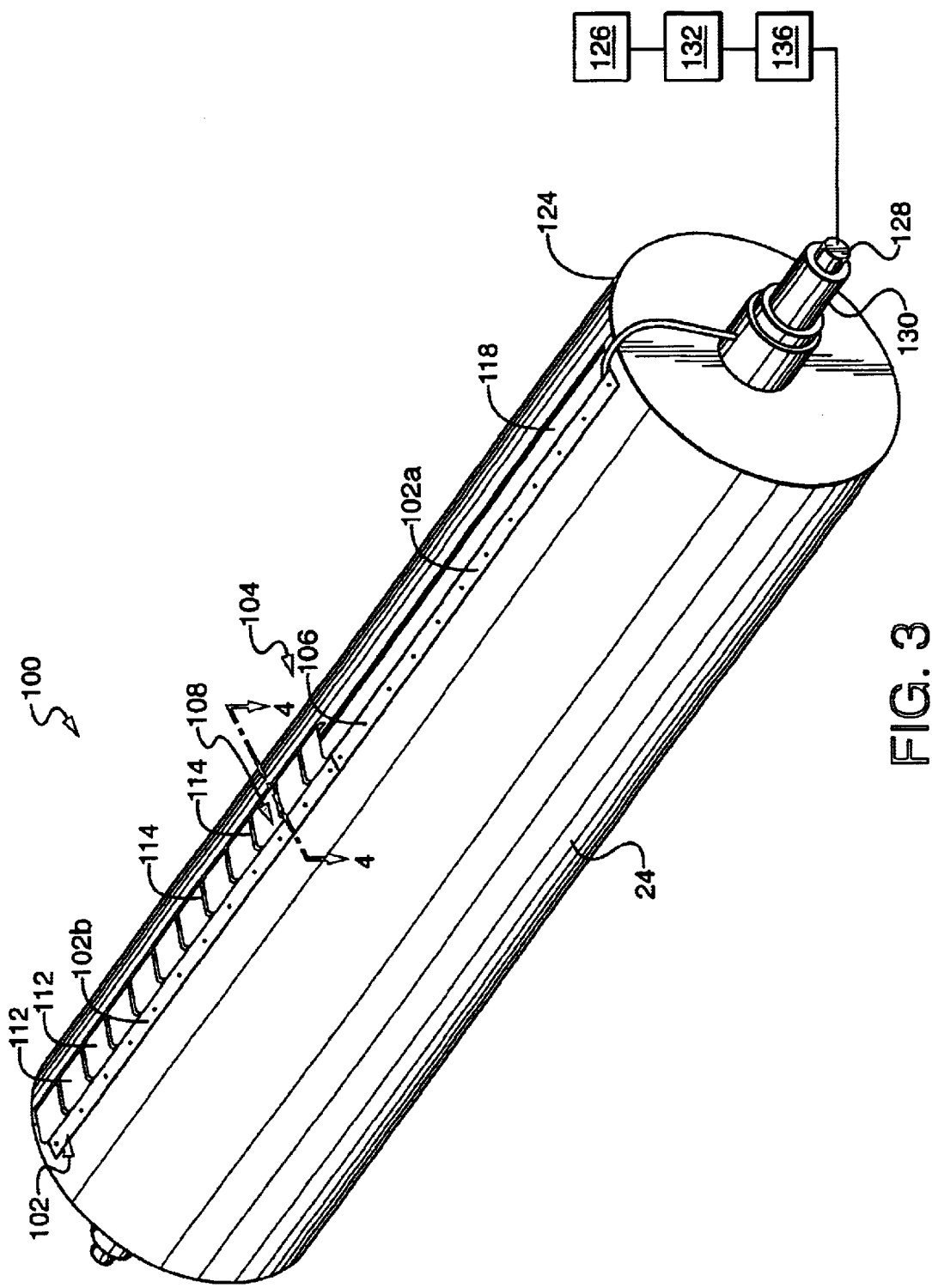
FIG. 3 is a perspective, partial, cut-away view of an external drum including a leading edge clamping mechanism in accordance with a first embodiment of the present invention.

As shown in FIG. 3, the leading edge clamping mechanism 100 is mounted on the external drum 24 and extends axially across a substantial portion of the width of the drum 24. The length of the leading edge clamping mechanism 100 is greater than the width of the largest printing plate 18 that may be imaged on the external drum 24. The specific location for the mounting of the leading edge clamping mechanism 100 on the external drum 24 is set using a fixture (not shown) attached to the external drum 24.

The leading edge clamping mechanism 100 includes a mounting portion 102 and a clamping portion 104. As shown in greater detail in FIGS. 4–6, the mounting portion 102 of the leading edge clamping mechanism 100 is secured to the external drum 24 using bolts 106 or other suitable mounting hardware. The mounting portion 102 may comprise one or more distinct sections (e.g., 102A, 102B, FIG. 3).

Figure 4:
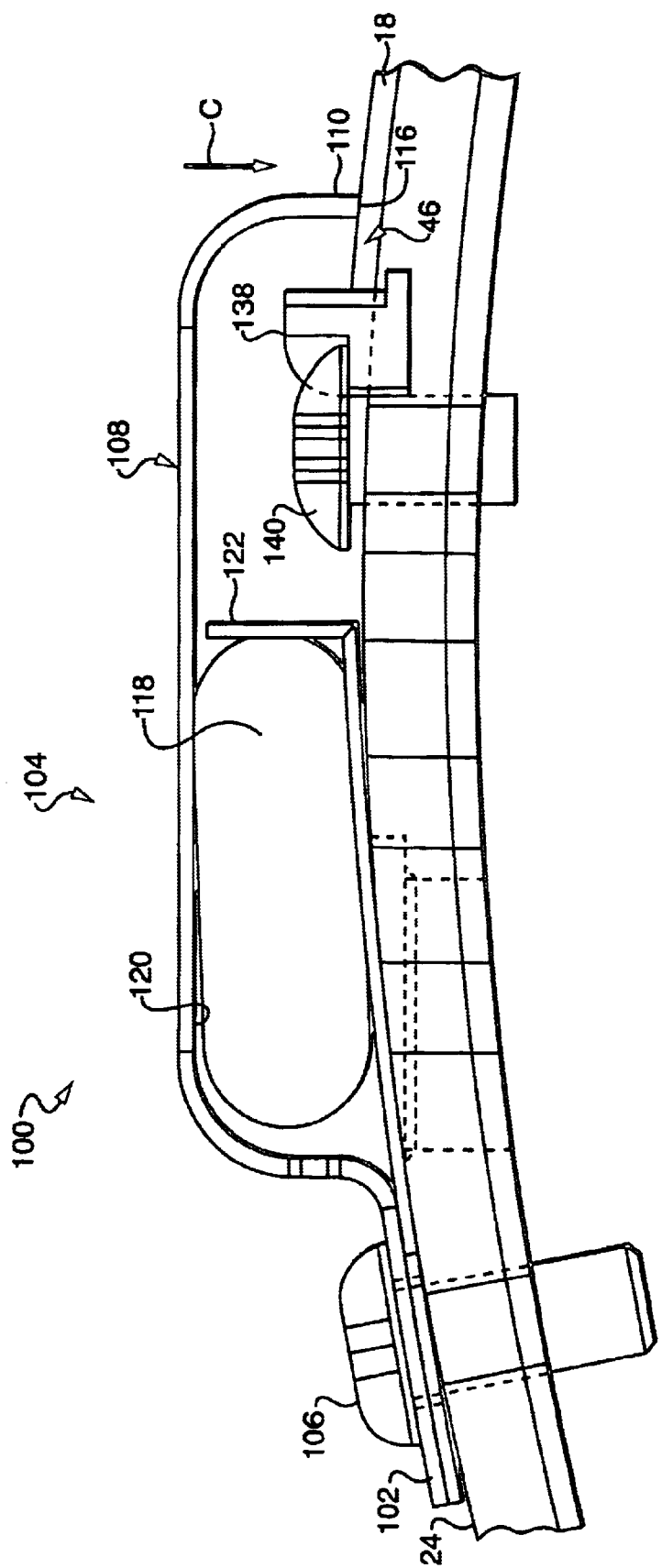
FIG. 4 is a cross-sectional view of the leading edge clamping mechanism of FIG. 3 in a plate clamping position.

The clamping portion 104 of the leading edge clamping mechanism 100 includes one or more spring segments 108. The spring segments 108 are formed using a lightweight spring steel or other suitable material. The use of a lightweight material lessens the possibility of distortion of the spring segments 108 due to centrifugal forces during imaging. When the leading edge clamping mechanism 100 is secured to the external drum 24, the distal end 110 of each spring segment 108 of the clamping portion 104 is biased against the surface of the external drum 24 as indicated by directional arrow C (FIG. 4). The biasing force provided by the spring segments 108 must be sufficient to hold the leading edge 46 of the printing plate 18 against the media support surface 28 of the external drum 24 as the external drum 24 is rotated at high speed during imaging. The magnitude of the biasing force is application specific and depends on many factors including the rotational speed of the external drum 24 during imaging, the type of printing plate 18 being imaged (e.g., aluminum or polyester substrate), etc.

Figure 6:
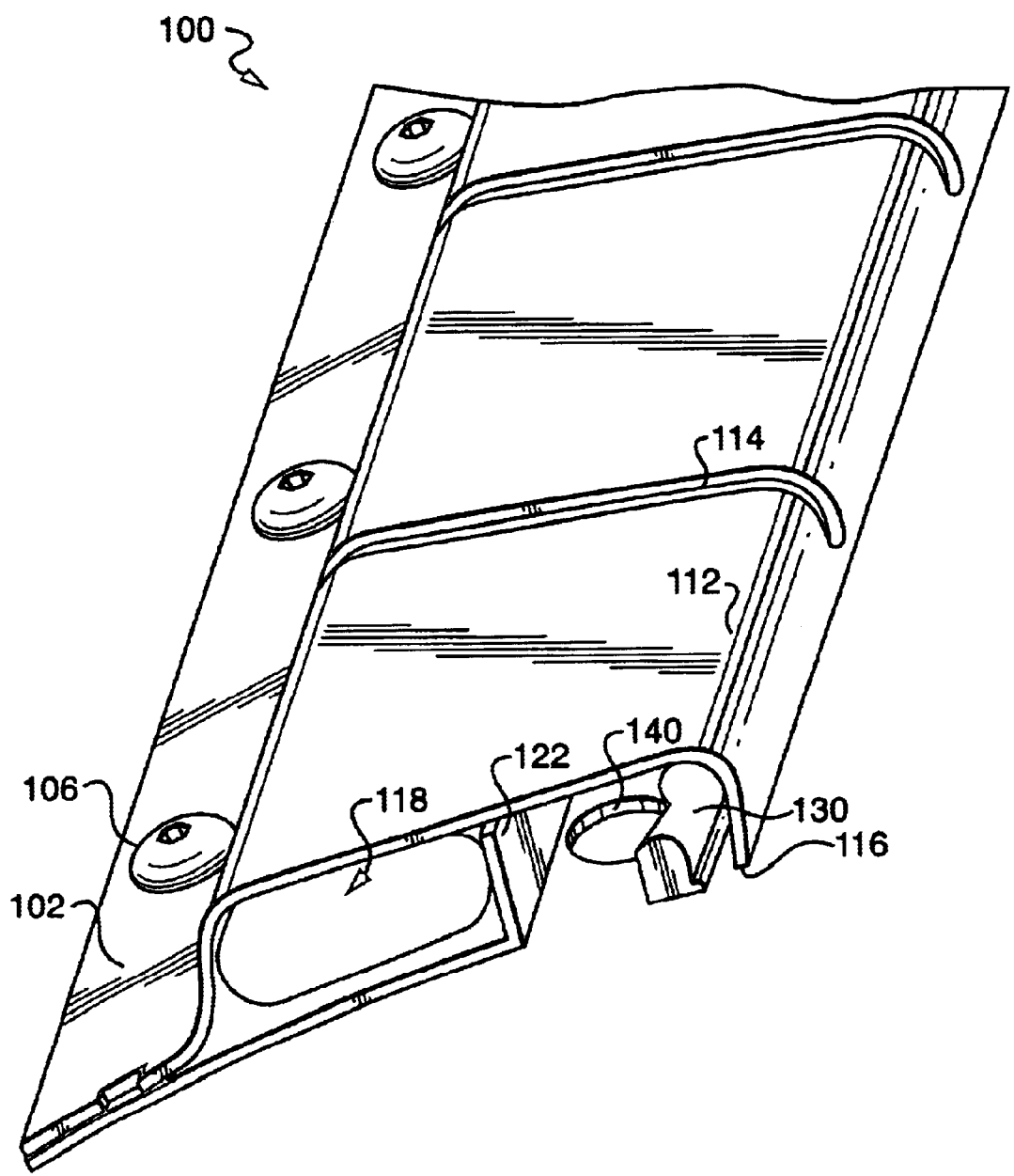
FIG. 6 is a perspective cross-sectional view of the leading edge clamping mechanism of FIG. 3.

Each spring segment 108 of the clamping portion 104 of the leading edge clamping mechanism 100 may be formed as a single, continuous unit or may be configured to include a plurality of fingers 112. The fingers 112 may be provided by forming slots 114 in the spring segments 108. As shown in FIGS. 3 and 4, the slots 114 may extend to the edge 116 of the distal end 110 of the spring segments 108, in which case the plurality of fingers 112 operate independently of one another, or, as shown in FIG. 6, the slots 114 may extend partially through the distal end 110 of the spring segments 108. These types of finger arrangement may, depending upon the specific configuration of the spring segments 108, provide more uniform loading on the external drum 24.

The leading edge clamping mechanism 100 is actuated using a pneumatic bladder 118. The pneumatic bladder 118 may be formed from an elastomer such as EPDM, silicone, neoprene, etc. The pneumatic bladder 210 (FIGS. 7 and 8) and inflatable seal clamp 304 (FIG. 9) described below may also be formed from similar elastomeric materials. The pneumatic bladder 118 extends under the spring segments 108 of the clamping portion 104 of the leading edge clamping mechanism 100, and is constrained between the external drum 24 and the underside 120 of the spring segments 108 by a support wall 122. Compressed air is provided via tube 124 (FIG. 3) to the pneumatic bladder 118 by a compressed air source 126 through a rotary coupling 128 in the shaft 130 of the external drum 24. A pressure relief valve 132 may be provided to prevent over-inflation of the pneumatic bladder 118.

Figure 5:
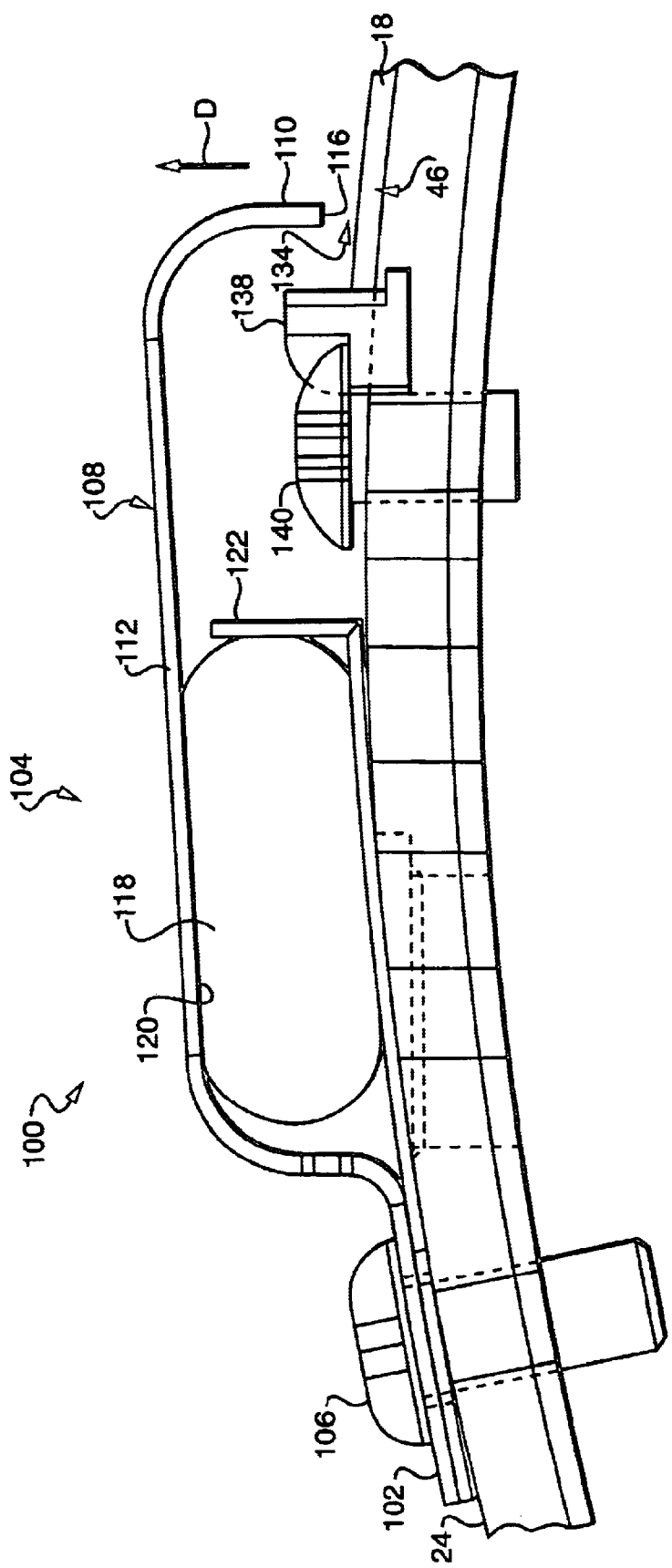
FIG. 5 is a cross-sectional view of the leading edge clamping mechanism of FIG. 3 in a plate release position.

As shown in FIG. 5, the pneumatic bladder 118 expands when it is supplied with compressed air from the compressed air source 126. Since lateral expansion of the pneumatic bladder 118 is limited by the support wall 122, the pneumatic bladder 118 necessarily expands toward the underside 120 of the spring segments 108. This forces the edge 116 of the distal end 110 of the spring segments 108 away from the surface of the external drum 24 as indicated by directional arrow D. This creates a space 134 through which the leading end 46 of a printing plate 18 may be inserted into, or removed from, the leading edge clamping mechanism 100. When the compressed air is released from the pneumatic bladder 118, the bladder 118 deflates and the edge 116 of the distal end 110 of the spring segments 108 is forced against the surface of the external drum 24. This clamps the leading edge 46 of printing plate 18 against the surface of the external drum 24 as shown in FIG. 4. The edge 116 of the distal end 110 of the spring segments 108 may be flat as shown or may be rounded. Other suitable shapes are also possible.

The compressed air may be released from the pneumatic bladder 118 using a valve 136 (e.g., a three-way solenoid valve) or other suitable air release system. A similar system may also be used to release air from the pneumatic bladder 210 and inflatable seal clamp 304 described below.

A plurality of registration pins 138 are mounted to the external drum 24 by bolts 140 or other suitable mounting hardware, and are positioned under the spring segments 108 between the support wall 122 and the distal end 110 of the segments 108. The registration pins 138 are used to accurately and repeatedly position (i.e., "register") the printing plate 18 on the external drum 24 for clamping and subsequent imaging.

Figure 7:
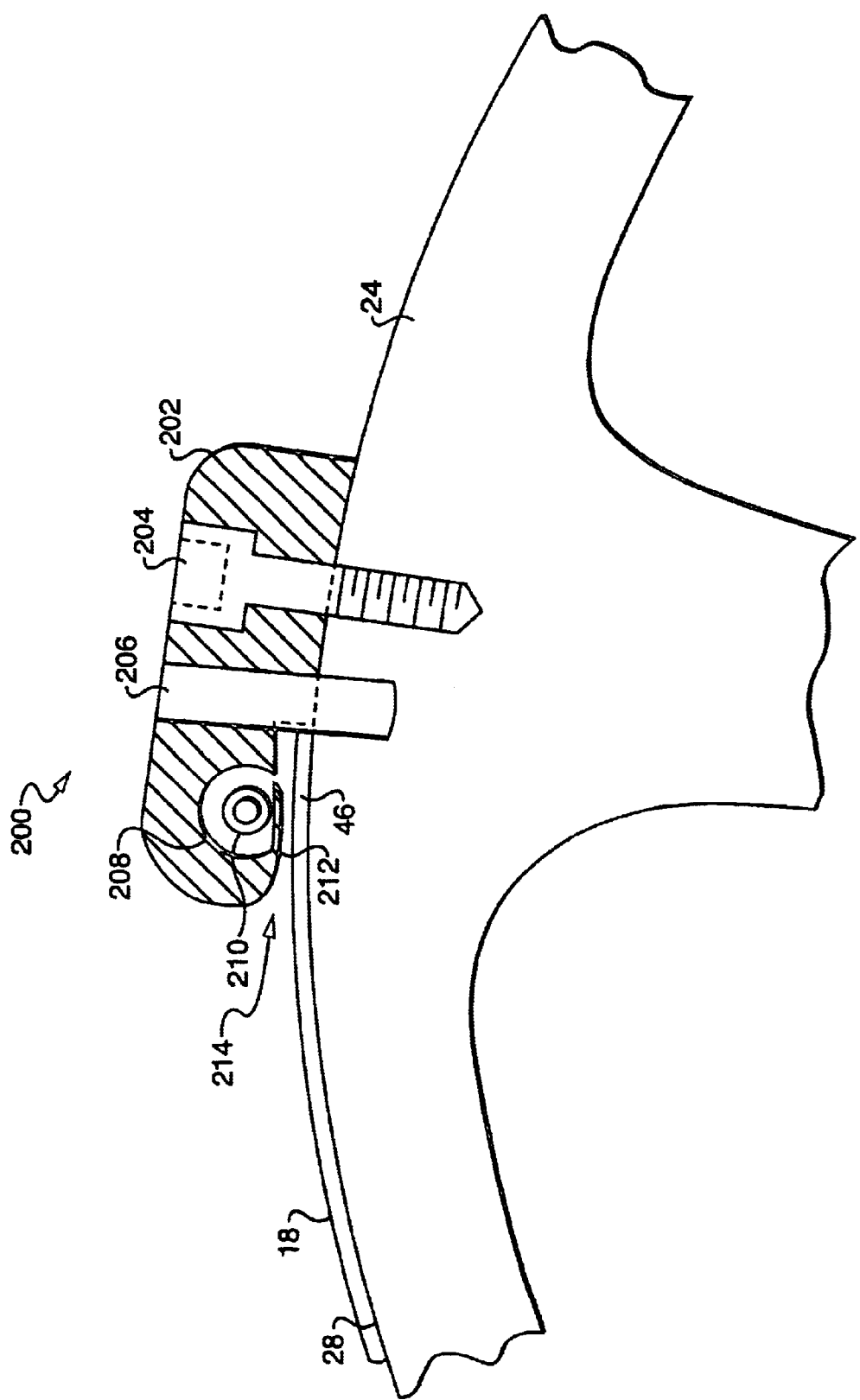
FIG. 7 is a cross-sectional view of a leading edge clamping mechanism in plate release position in accordance with another embodiment of the present invention.
Figure 8:
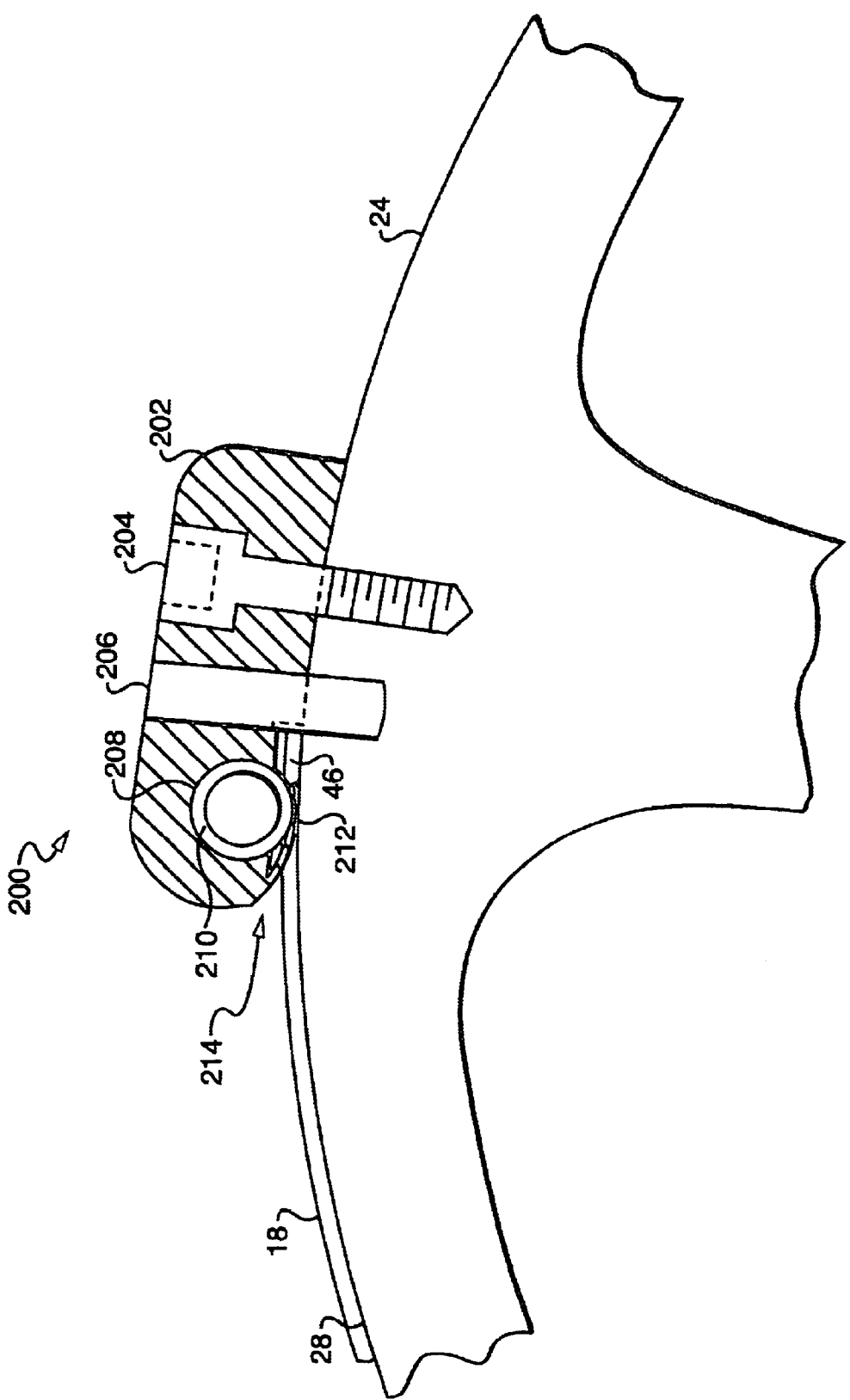
FIG. 8 is cross-sectional view of the leading edge clamping mechanism of FIG. 7 in a plate clamping position.

Another embodiment of a leading edge clamping mechanism 200 in accordance with the present invention is illustrated in FIGS. 7 and 8. The leading edge clamping mechanism 200 includes a body 202 that is mounted to the external drum 24 using mounting hardware 204, and a plurality of registration pins 206 for registering a printing plate 18 on the external drum 24. Although shown in cross-section in FIGS. 7 and 8, it should be realized that the leading edge clamping mechanism 200 extends across a substantial portion of the width of the external drum 24, much like the leading edge clamping mechanism 100 shown in FIG. 3.

The body 202 of the leading edge clamping mechanism 200 includes a channel 208 that contains and constrains a pneumatic bladder 210. A flexible shield 212, formed of plastic, metal, or other suitable material, is affixed to the body 202 adjacent the channel 208. When the pneumatic bladder 210 is not filled with compressed air, as shown in FIG. 7, the flexible shield 212 is in a retracted state, whereby the leading edge 46 of a printing plate 18 may be inserted into, or removed from, the mouth 214 of the leading edge clamping mechanism 200. It should also be noted that the flexible shield 212 helps to guide the leading edge 46 of the printing plate 18 into the mouth 214 of the leading edge clamping mechanism 200. When the pneumatic bladder 210 is inflated with compressed air (e.g., using a compressed air source 126, FIG. 3), the bladder 210 expands and forces the flexible shield 212 toward the external drum 24. As shown in FIG. 8, the flexible shield 212 clamps the leading edge 46 of the printing plate 18 against the surface of the external drum 24. Because a pneumatic bladder 210 is used to apply the clamping force against the printing plate 18, the leading edge clamping mechanism 200 self-adjusts for plate thickness.

The force applied against the leading edge 46 of the printing plate 18 by pneumatic bladder 210/flexible shield 212 must be sufficient to hold the leading edge 46 against the media support surface 28 of the external drum 24 as the external drum 24 is rotated at high speed during imaging. As described with regard to the leading edge clamping mechanism 100, the magnitude of this force is application specific.

The flexible shield 212 also protects the pneumatic bladder 210 from plate damage. In particular, the flexible shield 212 prevents the often sharp edges of the printing plate 18 from coming into contact with the pneumatic bladder 210. To this end, the dimensions of the flexible shield 212 are chosen to prevent any contact between the printing plate 18 and the pneumatic bladder 210.

Figure 9:
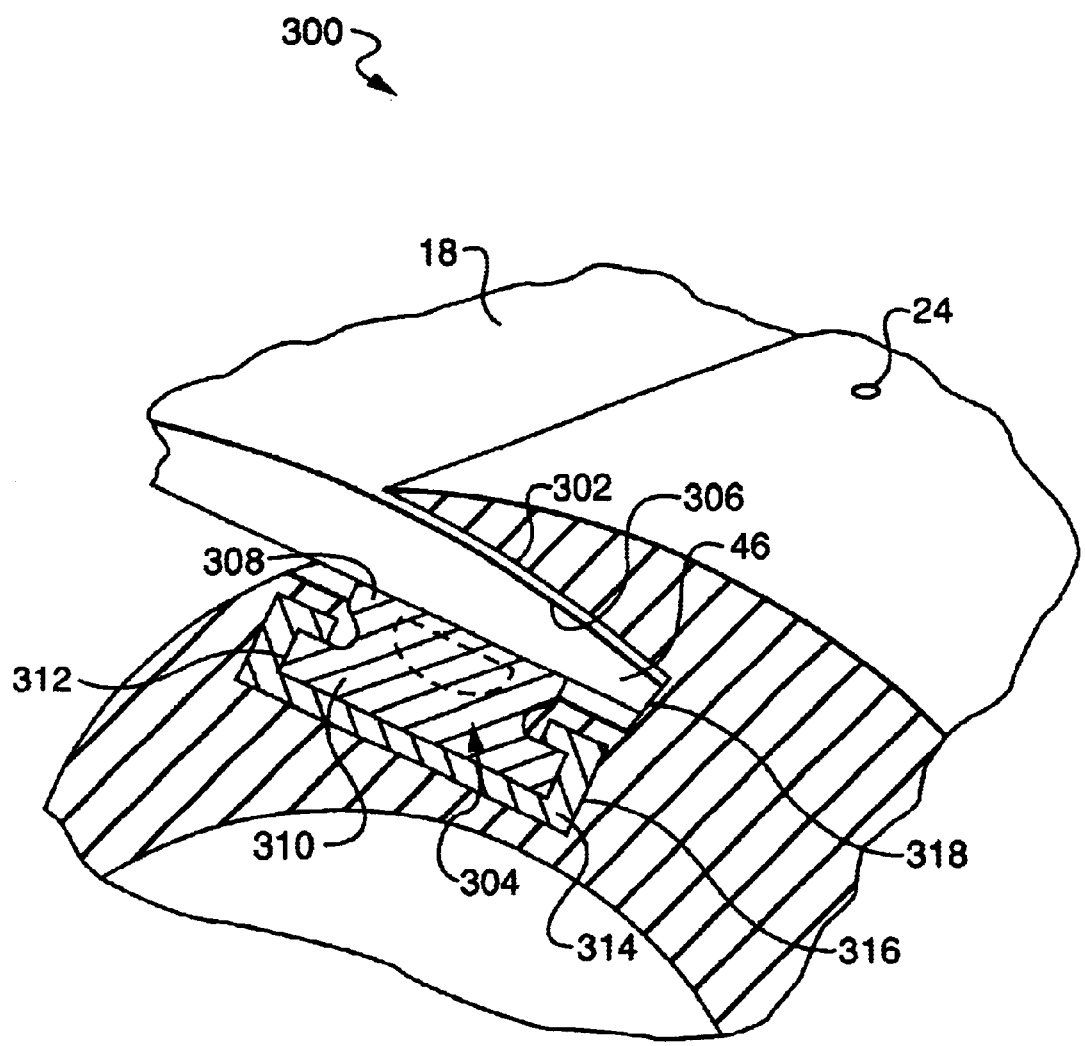
FIG. 9 is a perspective cross-sectional view of a leading edge clamping mechanism in accordance with another embodiment of the present invention.

Another embodiment of a leading edge clamping mechanism 300 in accordance with the present invention is illustrated in FIG. 9. The leading edge clamping mechanism 300 includes a groove 302 for receiving the leading edge 46 of a printing plate 18 and an inflatable seal clamp 304 for clamping the leading edge 46 of the printing plate 18 against a side 306 of the groove 302. As with the leading edge clamping mechanisms 100, 200, the leading edge clamping mechanism 300 extends across a substantial portion of the width of the external drum 24.

The inflatable seal clamp 304 includes an inflatable portion 308 and a base portion 310. The base portion 310 is mounted within a slot 312 formed in a bar 314. The bar 314 is positioned within a groove 316 that has been formed (e.g., machined) in the external drum 24.

The inflatable seal clamp 304 is normally in a deflated (i.e., "retracted") state. This allows the leading edge 46 of the printing plate 18 to be displaced into, or removed from, the groove 302 of the leading edge clamping mechanism 300 without contacting the inflatable seal clamp 304. The rear wall 318 of the groove 302 is used to register the printing plate 18 on the external drum 24 for clamping and subsequent imaging. With the printing plate 18 properly engaged within the groove 302, the inflatable portion 308 of the inflatable seal clamp 304 is inflated (e.g., using a compressed air source 126, FIG. 3). This clamps the leading edge 46 of the printing plate 18 against the side 306 of the groove 302. Because an inflatable seal clamp 304 is used to apply the clamping force against the printing plate 18, the leading edge clamping mechanism 300 self-adjusts for plate thickness.

The force applied against the leading edge 46 of the printing plate 18 by inflatable seal clamp 304 must be sufficient to hold the leading edge 46 in position within the groove 302 as the external drum 24 is rotated at high speed during imaging. As described with regard to the leading edge clamping mechanisms 100, 200, the magnitude of this force is application specific.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

I claim:

1. A leading edge clamping apparatus for clamping a leading end of a printing plate on an external drum of an imaging system, comprising:
    a spring segment disposed on the peripheral surface of the external drum, wherein the spring segment may be selectively displaced between a clamping position for clamping the leading edge of the printing plate against the external drum and a release position; and
    an inflatable member positioned between the spring segment and the peripheral surface of the external drum for displacing the spring segment between the clamping position and the release position.

2. The leading edge clamping apparatus according to claim 1, wherein the inflatable member is inflated to displace the spring segment from the clamping position to the release position.

3. The leading edge clamping apparatus according to claim 1, wherein the inflatable member is deflated to displace the spring segment from the release position to the clamping position.

4. The leading edge clamping apparatus according to claim 1, further comprising:
    a support wall for constraining the inflatable member between the external drum and the spring segment, and for limiting lateral expansion of the inflatable member.

5. The leading edge clamping apparatus according to claim 1, further comprising:
    a registration system for registering the printing plate on the external drum.

6. The leading edge clamping apparatus according to claim 5, wherein the registration system comprises a plurality of registration pins.

7. The leading edge clamping apparatus according to claim 5, wherein the registration system is positioned between the spring segment and the external drum.

8. The leading edge clamping apparatus according to claim 1, wherein the spring segment comprises a plurality of fingers.

9. The leading edge clamping apparatus according to claim 1, wherein a first end of the spring segment is secured to the external drum, and wherein a second end of the spring segment is free to move toward or away from the external drum upon a deflation or inflation, respectively, of the inflatable member.

10. A method for clamping a leading end of a printing plate on an external drum of an imaging system, comprising:
    providing a spring segment on the peripheral surface of the external drum;
    selectively displacing a spring segment between a clamping position for clamping the leading edge of the printing plate against the external drum and a release position; and
    displacing the spring segment between the clamping position and the release position using an inflatable member positioned between the spring segment and the peripheral surface of the external drum.

11. The method according to claim 10, further including:
    inflating the inflatable member to displace the spring segment from the clamping position to the release position.

12. The method according to claim 10, further comprising:
    deflating the inflatable member to displace the spring segment from the release position to the clamping position.

13. The method according to claim 10, further comprising:
    constraining the inflatable member between the external drum and the spring segment; and
    limiting lateral expansion of the inflatable member.

14. The method according to claim 10, further comprising:
    registering the printing plate on the external drum.

15. The method according to claim 14, wherein a plurality of registration pins are used to register the printing plate on the external drum.

16. The method according to claim 14, further comprising:
- positioning the registration system between the spring segment and the external drum.

17. The method according to claim 10, further comprising:
- securing a first end of the spring segment to the external drum, wherein the second end of the spring segment is free to move toward or away from the external drum upon a deflation or inflation, respectively, of the inflatable member.

18. An imaging system comprising:
- an external drum for supporting a printing plate;
- a system for recording image data onto the printing plate; and
- a leading edge clamping apparatus for clamping a leading end of the printing plate on the external drum, the leading edge clamping apparatus including:
  - a spring segment disposed on the peripheral surface of the external drum, wherein the spring segment may be selectively displaced between a clamping position for clamping the leading edge of the printing plate against the external drum and a release position; and
  - an inflatable member positioned between the spring segment and the peripheral surface of the external drum for displacing the spring segment between the clamping position and the release position.

19. The imaging system according to claim 18, wherein the inflatable member is inflated to displace the spring segment from the clamping position to the release position.

20. The imaging system according to claim 18, wherein the inflatable member is deflated to displace the spring segment from the release position to the clamping position.

21. The imaging system according to claim 18, further comprising:
- a support wall for constraining the inflatable member between the external drum and the spring segment, and for limiting lateral expansion of the inflatable member.

22. The imaging system according to claim 18, further comprising:
- a registration system for registering the printing plate on the external drum.

23. The imaging system according to claim 22, wherein the registration system comprises a plurality of registration pins.

24. The imaging system according to claim 22, wherein the registration system is positioned between the spring segment and the external drum.

25. A leading edge clamping apparatus for clamping a leading end of a printing plate on an external drum of an imaging system, comprising:
- an inflatable member positioned between the peripheral surface of the external drum and a spring segment located on the peripheral surface of the external drum for displacing the spring segment between a clamping position and a release position.

* * * * *